No. 651,441.  
C. KUHLEWIND.  
RELIEF DEVICE FOR ROLLS.  
(Application filed May 29, 1899.)

Patented June 12, 1900.

(No Model.)

WITNESSES  
Warren W. Swartz

INVENTOR  
Cornelius Kuhlewind  
by Bakewell & Bakewell  
his attys.

UNITED STATES PATENT OFFICE.

CORNELIUS KUHLEWIND, OF KNOXVILLE, PENNSYLVANIA, ASSIGNOR TO THE HYDRAULIC VALVE AND REGULATOR COMPANY, LIMITED, OF PITTSBURG, PENNSYLVANIA.

RELIEF DEVICE FOR ROLLS.

SPECIFICATION forming part of Letters Patent No. 651,441, dated June 12, 1900.

Application filed May 29, 1899. Serial No. 718,669. (No model.)

*To all whom it may concern:*

Be it known that I, CORNELIUS KUHLEWIND, of Knoxville borough, in the county of Allegheny and State of Pennsylvania, have invented a new and useful Improvement in Relief Devices for Rolls, of which the following is a full, clear, and exact description, reference being had to the accompanying drawings, forming part of this specification, in which—

Figure 1:
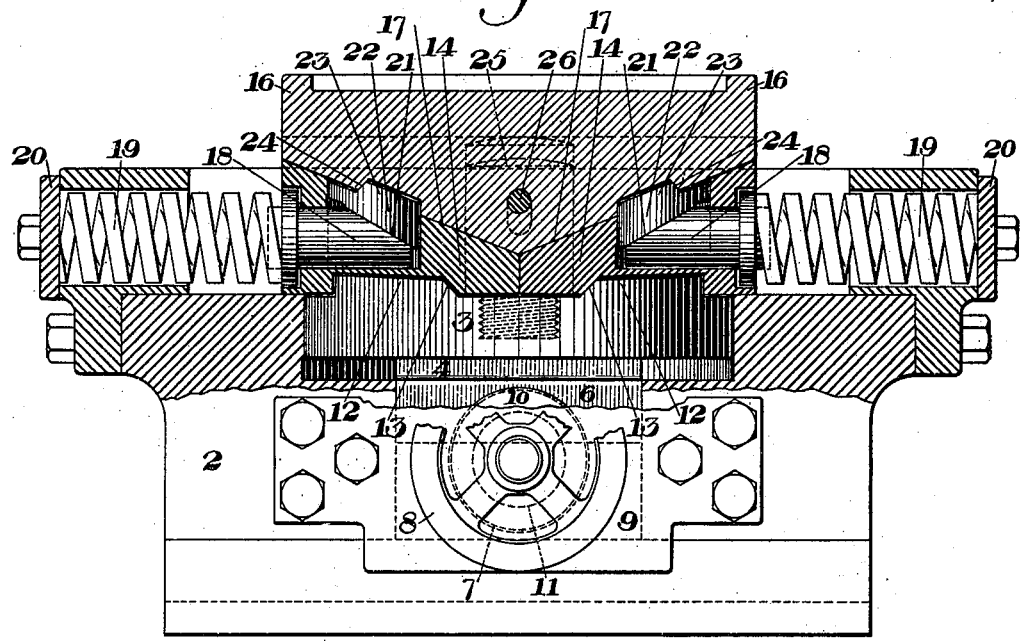
Figure 2:
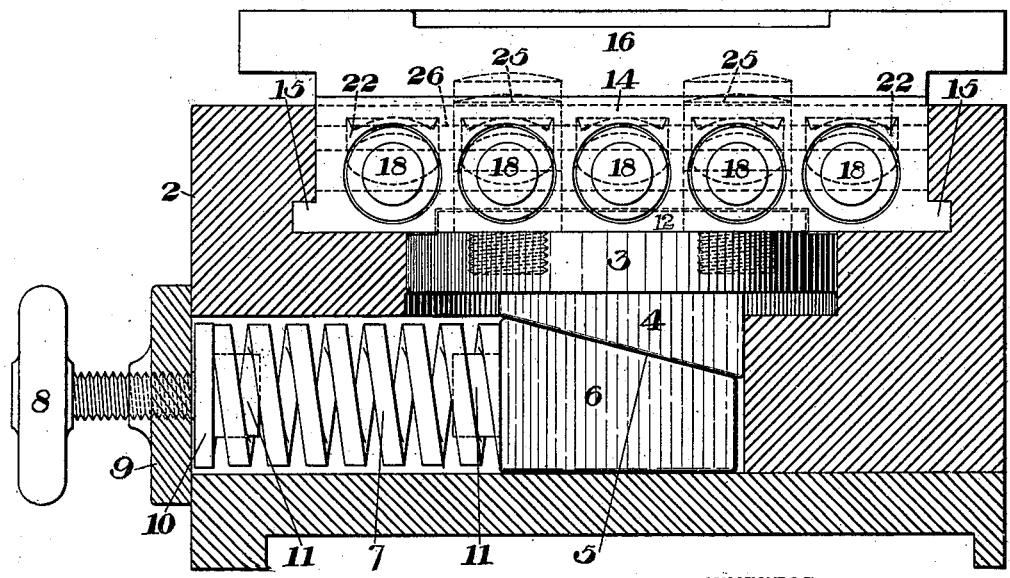

Figure 1 is an end elevation, partly broken away, of my improved relief device; and Fig. 2 is an irregular longitudinal section of the same.

My invention relates to the devices employed for automatically relieving the rolls of rolling-mills when the pressure upon them reaches a certain limit; and its object is to do away with the hydraulic cylinders which have heretofore been employed for this purpose and provide a simple and effective wedge system which will give the desired result and may be easily applied to existing mills.

In the drawings, 2 represents a breaker for the roll-bearings, the body of which is provided with a large central bore, preferably circular, within which fits a piston or plunger 3. From the lower side of the piston projects a central block 4, having an inclined lower face, upon which fits the corresponding face of a sliding horizontal wedge 6, which moves in a suitable hole leading through the side of the breaker-body and is normally forced inwardly by a strong spiral spring 7, the tension of which may be adjusted by means of a hand-wheel 8, having a screw-threaded stem engaging a screw-threaded hole in a plate 9, secured to the side of the breaker. The inner end of the stem is provided with a boss 10, bearing upon the end of the spring, and the wedge and boss are preferably provided with pins or stems 11, which enter the ends of the spring and hold it in place. The upper face of the piston 3 is provided with a projecting boss 12, having a central transverse recess with oppositely-inclined faces 13. The boss enters recesses in horizontally-sliding wedges 14, the inner faces of these recesses being beveled to fit upon and coact with the inclined faces 13 of the boss on the piston.

The wedges 14 are provided with lower projecting ribs 15, which enter suitable grooves in the breaker-body and guide these wedges in their movements. The inner ends of the wedges contact with each other when the parts are in normal position, as shown in Fig. 1.

A vertically-movable block 16 rests upon the wedges 14 and is provided with lower inclined wedge-faces 17, which fit upon the upper faces of the wedges 14. Each wedge 14 is provided with a series of horizontal plungers 18, which are normally forced inwardly by springs 19, held in place by outer plates 20, bolted along the sides of the breaker. The inner ends of the plungers 18 are provided with inclined wedge-faces which fit upon correspondingly-inclined faces 21 of loose blocks 22, which are preferably cylindrical and fit within vertical holes in the wedges 14. These blocks are provided with upward extensions 23, having inclined faces 24, which coact with similar inclined faces in recesses of the top block, within which the extensions fit. The top block is guided in its vertical movements by two pins 25, which are screwed into the plunger and are provided with slotted heads entering the wedge-block, which block is provided with cross-pins 26, extending through these slots.

I have shown the device as provided with five of the plungers 18 upon each side; but I find in practice that one of the spring-pressed plungers upon each side is generally sufficient to give the desired result, and I do not desire to limit myself to any particular number of these plungers.

In using the device, a pair of them being applied to the bearings of one of the rolls instead of the ordinary breakers, the rolls operate in the usual manner until an excess pressure is obtained—as, for instance, by a piece sticking in the rolls. When this pressure reaches the predetermined limit, the top wedge-block will move down, forcing apart the horizontally-moving wedges, the piston moves down, and the lower wedge 6 is moved outwardly against the pressure of the spring 7. At the same time the small blocks 22 are forced out of the recesses in the top wedge-block and move outwardly with the horizontal wedges. The pressure upon the rolls is thus relieved, and as soon as the excess pressure is removed the parts resume their normal positions, as shown, and the breaker then acts as a solid block until the pressure again reaches the predetermined limit.

The advantages of my invention result from the fact that the necessity for hydraulic pressure is done away with, and the device is thus greatly simplified. The limit at which the parts will move is easily adjusted by regulating the pressure upon the spring 7 by means of the hand-wheel 8. The small loose blocks 22 are an important feature of my invention, and their inclined faces, which bear upon the recessed faces of the upper block, are preferably at a sharper angle than those of the wedges, so that they act in somewhat the manner of a lock, holding the parts in their normal position until the pressure reaches the limit determined upon, when they will be forced out of the recesses and allow the parts to move.

Many variations may be made in the form and arrangement of the parts without departing from my invention, since

I claim—

1. A roll-breaker having coacting wedges and springs mounted upon and movable therewith, and a stationary rigid abutment against which the system acts, the springs being arranged to hold the wedges in place until the pressure reaches a determined limit; substantially as described.

2. A breaker having a vertically-movable wedge-block, oppositely-located outwardly-movable wedge-blocks coacting therewith, and locking-blocks between the vertical wedge-block and the outwardly-movable wedges, said locking-blocks being arranged to release the wedges when the pressure reaches a determined limit; substantially as described.

3. A relief device for rolls comprising a breaker having a wedge system, and locking-blocks arranged to automatically release the wedges when the pressure reaches a determined limit; substantially as described.

4. A relief device for rolls comprising a breaker having a vertically-movable wedge-block, outwardly-movable spring-pressed wedges coacting therewith, a vertically-movable plunger arranged to be actuated by the outwardly-movable wedges, and a spring-pressed wedge connection for the plunger; substantially as described.

5. A relief device for rolls comprising a breaker having a vertically-movable wedge-block, horizontally-movable oppositely-located wedges coacting therewith, locking-blocks between the wedge-block and the horizontally-movable wedges, spring-pressed plungers arranged to hold the locking-blocks in place, and a vertically-movable plunger actuated by the wedges; substantially as described.

6. A relief device for rolls comprising a breaker having a vertically-movable wedge-block with oppositely-inclined lower faces, horizontally-movable oppositely-located wedges coacting therewith, locking-blocks between the wedge-block and the horizontally-movable wedges, spring-pressed plungers bearing upon the horizontally-movable wedges and having inclined faces bearing upon the locking-blocks, and a movable plunger actuated by the wedges and having a spring-pressed wedge connection; substantially as described.

In testimony whereof I have hereunto set my hand.

CORNELIUS KUHLEWIND.

Witnesses:
C. BYRNES,
G. I. HOLDSHIP.